United States Patent
López González et al.

(10) Patent No.: US 12,159,445 B2
(45) Date of Patent: Dec. 3, 2024

(54) METHOD AND SYSTEM FOR IDENTIFYING ANOMALIES IN X-RAYS

(71) Applicant: QUIBIM, S.L., Valencia (ES)

(72) Inventors: Rafael López González, Valencia (ES); Belén Fos Guarinos, Valencia (ES); Fabio García Castro, Valencia (ES); Ana Maria Jiménez Pastor, Valencia (ES); Angel Alberich Bayarri, Valencia (ES); Luis Marti Bonmati, Valencia (ES)

(73) Assignee: QUIBIM, S.L., Valencia (ES)

( * ) Notice: Subject to any disclaimer, the term of this patent is extended or adjusted under 35 U.S.C. 154(b) by 331 days.

(21) Appl. No.: 17/620,025

(22) PCT Filed: Jan. 30, 2020

(86) PCT No.: PCT/ES2020/070068
§ 371 (c)(1),
(2) Date: Dec. 16, 2021

(87) PCT Pub. No.: WO2020/254700
PCT Pub. Date: Dec. 24, 2020

(65) Prior Publication Data
US 2022/0366671 A1 Nov. 17, 2022

(30) Foreign Application Priority Data
Jun. 17, 2019 (ES) ................ ES201930551

(51) Int. Cl.
*G06V 10/764* (2022.01)
*G06N 3/045* (2023.01)
(Continued)

(52) U.S. Cl.
CPC ........... *G06V 10/764* (2022.01); *G06N 3/045* (2023.01); *G06N 3/08* (2013.01); *G06T 7/0012* (2013.01); *G06T 2207/10116* (2013.01)

(58) Field of Classification Search
None
See application file for complete search history.

(56) References Cited

U.S. PATENT DOCUMENTS

| | | |
|---|---|---|
| 2015/0278642 A1 | 10/2015 | Chertok et al. |
| 2018/0260793 A1 | 9/2018 | Li et al. |

(Continued)

FOREIGN PATENT DOCUMENTS

| | | |
|---|---|---|
| CN | 109118485 A | 1/2019 |
| CN | 109598227 A | 4/2019 |
| CN | 109614861 A | 4/2019 |

OTHER PUBLICATIONS

Islam et al., "Abnormality Detection and Localization in Chest X-Rays using Deep Convolutional Neural Networks," arXiv: 1705.09850v3 [cs.CV] Sep. 27, 2017 (Year: 2017).*

(Continued)

*Primary Examiner* — Soo Shin
(74) *Attorney, Agent, or Firm* — Sughrue Mion, PLLC

(57) ABSTRACT

The present invention relates to a method and a system for identifying an anomaly in a chest X-ray image in posteroanterior orientation based on neural networks, which comprises: receiving the image in a classification module with a plurality of convolutional neural networks, each trained to identify at least one specific graphic pattern associated with a pathology; obtaining, for each of the convolutional neural networks, a probability of detecting the specific graphic pattern; receiving in a fully connected neural network all the (Continued)

probabilities obtained; and determining whether the chest X-ray image contains an anomaly, based on the detection probabilities provided.

13 Claims, 1 Drawing Sheet

(51) Int. Cl.
*G06N 3/08* (2023.01)
*G06T 7/00* (2017.01)

(56) References Cited

U.S. PATENT DOCUMENTS

| | | | | |
|---|---|---|---|---|
| 2018/0357514 A1* | 12/2018 | Zisimopoulos | ...... | G06V 10/764 |
| 2020/0093455 A1* | 3/2020 | Wang | ...... | G06V 10/764 |
| 2020/0219262 A1* | 7/2020 | Hsiao | ...... | G06V 10/764 |
| 2021/0326653 A1* | 10/2021 | Zhou | ...... | G16H 30/40 |
| 2023/0148996 A1* | 5/2023 | Arntfield | ...... | A61B 8/4427 |
| | | | | 600/437 |

OTHER PUBLICATIONS

Connor M. Shorten "An exploration into synthetic data and generative adversarial networks," MS Thesis, Florida Atlantic University, May 2019 (Year: 2019).*
Laifeng Huang, et al., "Automatic Classification of Retinal Optical Coherence Tomography Images With Layer Guided Convolutional Neural Network", IEEE Signal Processing Letters, Jul. 2019, pp. 1026-1030, vol. 26, No. 7.
International Search Report for PCT/ES2020/070068 dated Jun. 2, 2020 [PCT/ISA/210].
Written Opinion for PCT/ES2020/070068 dated Jun. 2, 2020 [PCT/ISA/237].
Written Opinion of the International Preliminary Examining Authority dated Jul. 19, 2021 [PCT/IPEA/408].
International Preliminary Report on Patentability dated Oct. 6, 2021 [PCT/IPEA/409].

* cited by examiner

METHOD AND SYSTEM FOR IDENTIFYING ANOMALIES IN X-RAYS

CROSS REFERENCE TO RELATED APPLICATIONS

This application is a National Stage of International Application No. PCT/ES2020/070068 filed Jan. 30, 2020, claiming priority based on Spanish Patent Application No. P201930551 filed Jun. 17, 2019.

OBJECT OF THE INVENTION

The present invention relates to the technical field of the computer-aided analysis of medical images, and more specifically to the processing in neural networks of X-ray images, such as chest X-rays in posteroanterior orientation, for an automatic detection of signs of pathologies which can help specialists in their subsequent diagnosis.

BACKGROUND OF THE INVENTION

Today, X-ray images are a preliminary diagnosis detection or early diagnosis tool primarily used to rule out a number of different diseases, especially cardiovascular and respiratory diseases, in which the early detection is crucial.

Chest X-rays continue to be the diagnostic examination technique most often performed, where especially posteroanterior and lateral views are fundamental for observing important anatomical structures such as the heart, lungs, and bones.

Interpreting said chest X-rays is a complex task that requires a lot of time for highly qualified personnel who have very large workloads, thereby increasing delays in diagnoses and increasing interpretation errors.

The state of the art contemplates systems for aiding specialists based on artificial intelligence and graphic processing units which, based on datasets of previously classified images, perform a first filtering of X-rays assigning a probability in each X-ray of presenting a specific pathology, which allows the specialist to prioritize the work list.

Among other problems, these solutions are focused on specific pathologies and use independent classifiers which are unable to evaluate the broad spectrum of possible pathologies present in a chest X-ray. One consequence is that it is too risky to rule out an X-ray or organize a work list based solely on probabilities of specific and independent pathologies.

Therefore, there is a need in the state of the art for a solution which does not require the intervention of any specialist for being able to classify, without actually diagnosing, X-rays according to a preliminary and automatic identification of anomalies. A system for the automatic classification of chest X-rays would be very valuable for patients, medical professionals, and healthcare organizations, primarily helping radiologists to prioritize those X-rays with identified anomalies in examinations for interpretation.

DESCRIPTION OF THE INVENTION

For the purpose of meeting the objectives and prevent the aforementioned drawbacks, the present invention describes, in a first aspect, a method for identifying an anomaly in a chest X-ray image based on neural networks, which comprises:

providing the chest X-ray image in a classification module, wherein the classification module comprises a plurality of convolutional neural networks, each trained to identify at least one specific graphic pattern associated with a pathology;

obtaining, for each of the convolutional neural networks, a probability of detecting at least one specific graphic pattern;

receiving in a fully connected neural network the probabilities obtained by each of the convolutional networks; and determining, by the fully connected neural network, whether the chest X-ray image contains an anomaly, based on the probabilities of detecting specific graphic patterns provided by the plurality of convolutional networks.

One of the objectives of the present invention, facilitating the work of radiologists by performing a selection of chest X-rays, giving a preliminary "normal" or "abnormal" result, which means that certain signs of cardiovascular or respiratory diseases that would require being evaluated by a radiologist as a priority have been detected in the graphic patterns, is thus advantageously achieved.

In one embodiment of the invention, each of the convolutional neural networks is trained with respective balanced sets of training images previously labeled in a binary partition, which classifies the set in two image halves, depending on whether they meet a specific criterion for each of the convolutional networks. Advantageously, the balanced distribution for each of the convolutional neural networks allows refining the classification of each of them, by providing training data representative of both classes, "normal" and "abnormal".

In one embodiment of the invention, training the fully connected neural network with a balanced set of training images previously labeled in a binary partition, which classifies the set in two image halves depending on whether an anomaly is identified therein, is contemplated. The fully connected neural network thus advantageously provides at its output a classification in which all the partial results provided by the convolutional neural networks have been taken into account, such that the final result is not biased by any specific pathology, but rather offers a global result. Specifically, in one of the embodiments of the invention, the training of the neural network is performed with balanced partitions of the ChestXray14 public dataset.

Additionally, in one of the embodiments of the present invention a processing of the X-ray image prior to the step of providing said image to the classification module is contemplated, wherein processing comprises: normalizing the chest X-ray image to gray values (pixel intensity) in a range between 0 and 1; re-scaling rows and columns of the normalized image to a size of 256×256; and equalizing the gray value histogram of the re-scaled image.

The plurality of convolutional neural networks can be defined according to a VGG-19 architecture, wherein the plurality of convolutional neural networks are configured for accepting matrices having a size of 256×256×3.

In one of the embodiments, substituting the fully connected layers of the VGG-19 architecture with a customized fully connected layer with two output neurons and providing the probability of detecting output by using the 'Softmax' activation function as a final layer of each convolutional neural network, is contemplated.

According to one of the embodiments of the invention, each of the convolutional neural networks comprises a series of convolutional blocks, which further comprises adding an output reduction layer between said series of convolutional blocks and the customized fully connected layer.

For obtaining a probability of detecting at least one specific graphic pattern, in each of the convolutional neural networks, the following steps are contemplated: filtering the chest X-ray image by means of convolution operations in the convolutional blocks of each of the convolutional neural networks; reducing the chest X-ray image, in the intermediate reduction layers intercalated in the convolutional blocks, by means of dividing said image into sub-regions, which are substituted by the maximum value of the sub-region, and by means of averaging the gray values of the output of the convolutional blocks in the output reduction layer; and classifying the result of the output reduction layer by the two output neurons of the customized fully connected layer in one of the two available classes.

Additionally, in one of the embodiments of the invention, generating a heat map based on the outputs of the output reduction layer is contemplated.

A second aspect of the invention relates to a system for identifying an anomaly in a chest X-ray image based on neural networks, which comprises:
  a classification module, configured for receiving the chest X-ray image, wherein said classification module comprises a plurality of convolutional neural networks, each trained to identify at least one specific graphic pattern associated with a pathology, and obtaining a probability of detecting at least one specific graphic pattern; and
  a fully connected neural network, configured for receiving the probabilities obtained by each of the convolutional neural networks of the classification module and for determining whether the chest X-ray image contains an anomaly, based on the probabilities of detecting specific graphic patterns provided by the plurality of convolutional neural networks.

Each of the convolutional networks of the classification module comprises, according to one of the embodiments of the invention: convolutional blocks configured for filtering the chest X-ray image by means of a convolution operation; intermediate reduction layers configured for reducing the chest X-ray image by means of dividing said image into sub-regions, which are substituted by the maximum value of the sub-region; an output reduction layer for reducing the image by means of averaging its gray values; and a customized fully connected layer configured for classifying the result of the output reduction layer by the two output neurons, in one of the two available classes.

Additionally, it is contemplated in one of the embodiments that the plurality of convolutional networks are independent convolutional networks each specifically trained to determine a probability of presence of one of the following pathologies: atelectasis, cardiomegaly, pleural effusion, infiltration, mass, nodule, pneumonia, pneumothorax, consolidation, edema, emphysema, fibrosis, pleural thickening, and diaphragmatic hernia.

In one of the embodiments of the present invention, a processing module configured for receiving the output from the output reduction layers of the convolutional neural networks and generating a heat map with information of at least one graphic pattern associated with each identified pathology is contemplated.

The present invention thus presents an advantageous deep learning system based on convolutional neural networks as a computer-aided diagnostic tool for the classification of chest X-rays and prioritizing X-ray work lists.

A final aspect of the present invention relates to a computer-implemented method for identifying an anomaly in a chest X-ray image based on neural networks, which comprises: providing the chest X-ray image in a classification module, wherein the classification module comprises a plurality of convolutional neural networks, each trained to identify at least one specific graphic pattern associated with a pathology; obtaining, for each of the convolutional neural networks, a probability of detecting at least one specific graphic pattern; receiving in a fully connected neural network the probabilities obtained by each of the convolutional networks; and determining, by the fully connected neural network, whether the chest X-ray image contains an anomaly, based on the probabilities of detecting specific graphic patterns provided by the plurality of convolutional networks.

In one embodiment of the present invention, at least one of the classification modules and the fully connected network are implemented in a central processing unit CPU. Additionally, in a specific embodiment of the present invention, at least one of the classification modules and the fully connected network is implemented in a supporting graphic processing unit GPU of the central processing unit.

In one of the embodiments of the present invention, implementing the fully connected neural network in reconfigurable hardware is contemplated.

Among the most distinguishing features of the present invention, it is necessary to highlight the advantageous grouping of different convolutional neural networks (CNN) and connection with a fully connected neural network (FCNN), herein referred to as "referee neural network". Advantageously, the training of the convolutional neural networks, specialized in detecting image patterns characteristic of specific pathologies in chest X-rays, is subsequently used for training the mentioned referee neural network, which obtains at its output the probability of the chest X-ray of being "abnormal", i.e., pathological.

Based on the foregoing, the present invention represents a valuable contribution to the state of the art, where known solutions training artificial intelligence systems in a solo step, without considering the inclusion of a second neural network that can learn from the mistakes of earlier ones for providing the probability of a chest X-ray of being normal/abnormal.

BRIEF DESCRIPTION OF THE FIGURES

To complete the description of the invention and for the purpose of helping to better understand the features thereof, according to a preferred example of embodiment thereof, a set of drawings is attached in which the following figures are depicted in an illustrative and non-limiting manner.

DETAILED DESCRIPTION OF THE INVENTION

The present invention discloses a method and a system for classifying chest X-rays in two groups, normal/abnormal, based on the automatic identification of features characteristic of different pathologies.

Figure 1:
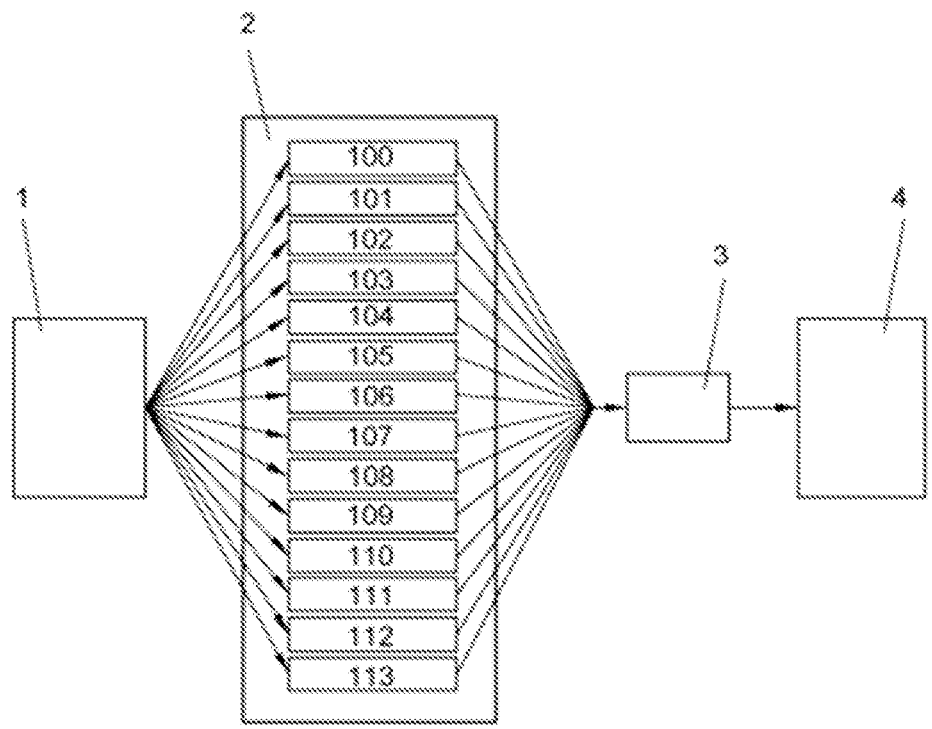
FIG. 1 depicts a block diagram of an embodiment of the invention.

FIG. 1 depicts the basic blocks of the invention, according to one of its embodiments, where image 1 is processed by a set 2 of convolutional neural networks, abbreviated as CNN, each one specialized in a specific pathology, previously trained with a large balanced database. Each CNN provides at its output a probability of the presence/absence of a specific pathology and a selection of the regions of the image that have influenced the provided probability the most.

Anomalies in a chest X-ray may be due to a wide range of pathologies and may be represented differently in different areas of the image, such that there is a multitude of possible combinations. It is not possible to establish a linearity between the signs obtained based on a single CNN and a normal/abnormal output classification such as that sought by the present invention, therefore the outputs of the CNNs are grouped at the input of a fully connected neural network 3 (herein referred to as "referee neural network") which has been trained with a large database in order to combine the predictions of each CNN and thus obtain at its output 4 the final abnormality probability for classifying the images.

In one embodiment of the invention, a pre-processing of the input image, by means of grey intensity level normalization techniques and with re-scaling of rows and columns is contemplated. For example, when taking a posteroanterior chest X-ray, it is normalized to gray values in the range [0, 1], rows and columns are re-scaled to a size of 256×256, and the histogram of gray levels is equalized.

In one of the embodiments of the invention, each CNN specialized in a specific pathology is defined based on VGG-19 architecture. The set 2 of convolutional neural networks comprises fourteen CNNs specific for fourteen pathologies, but the number of networks and pathologies could obviously be increased in other embodiments. The fourteen CNNs of this embodiment are: atelectasis CNN 100, cardiomegaly CNN 101, pleural effusion CNN 102, infiltration CNN 103, mass CNN 104, nodule CNN 105, pneumonia CNN 106, pneumothorax CNN 107, consolidation CNN 108, edema CNN 109, emphysema CNN 110, fibrosis CNN 111, pleural thickening CNN 112, and diaphragmatic hernia CNN 113. Each CNN network provides the probability of the presence/absence of one of the listed pathologies, as well as an attention map with the patterns characteristic of the pathology in the image in the event that said pathology has been identified.

Figure 2:
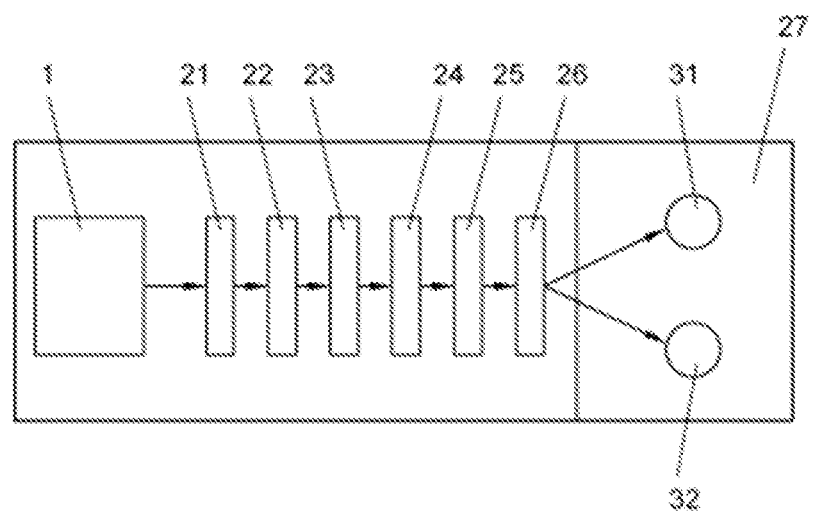
FIG. 2 depicts in detail an embodiment of one of the convolutional neural networks of the classification module.

FIG. 2 depicts in a more detailed manner the structure of these CNN networks of the set 2 of FIG. 1, where the input image 1 is provided in a series of blocks 21-25, formed by convolutional layers alternated with intermediate reduction layers, designed according to VGG-19 architecture:

- Block 21 is formed by 2 convolutional layers, with 64 filters having a size of 3×3 and a 'Max Pooling' reduction layer with the grouping of regions having a size of 2×2.
- Block 22 is formed by 2 convolutional layers, with 128 filters having a size of 3×3 and a 'Max Pooling' reduction layer with the grouping of regions having a size of 2×2.
- Block 23 is formed by 4 convolutional layers, with 256 filters having a size of 3×3 and a 'Max Pooling' reduction layer with the grouping of regions having a size of 2×2.
- Blocks 24 and 25 are formed by 4 convolutional layers, with 512 filters having a size of 3×3 and a 'Max Pooling' reduction layer with the grouping of regions having a size of 2×2.
- Block 26 is formed by the 'Global Average Pooling' output reduction layer which averages the values of the different channels of the results of the block 25.

For training the fourteen neural CNN networks of this embodiment, VGG-19 architecture is followed. The training dataset chosen for establishing the initialization of CNN weights is the Imagenet public dataset for the purpose of using 'Transfer Learning'. These CNN networks are configured for accepting as input matrices of size 256×256×3, which are the input chest X-rays after having gone through the pre-processing step explained above. Furthermore, the fully connected layers of this architecture are ruled out to add another customized fully connected layer 27 with two output neurons 31, 32, which use the 'Softmax' activation function as a final classifying layer for processing outputs and providing the probability of the image presenting or not a specific pathology.

Between the convolutional layers 21-25 and the fully connected layers 27 of the network there is included a 'Global Average Pooling' output reduction layer 26, the outputs of which are subsequently used for generating attention maps of the system, which can be in the form of heat maps, for example. The 'Global Average Pooling' layer directly connects activation maps at the output of the block 25 with each of the output neurons 31, 32 through the weights of the network associated with the connections of block 26 with block 27.

Each CNN is trained with a balanced dataset of chest X-rays previously labeled with the presence/absence of a specific pathology. This requirement of providing a balanced dataset makes it necessary for the training dataset to be different for each of the pathologies. In this embodiment, the training process has a duration of 100 'epochs' and a network input 'batch size' of 200, using 'categorical cross-entropy' as a cost function. During training, random transformations are applied on the images of the dataset by means of rotations, translations and flips. The networks are validated with a dataset different from the one used for training them, but labeled in the same way. This new dataset is analyzed by the networks to obtain certain measurements, such as the area under the 'ROC' curve, precision, accuracy, sensitivity, and specificity.

The probabilities obtained by the CNNs at its output are provided at the input of the referee neural network 3 which estimates, based on the probabilities of the CNNs, the probability of abnormality in the image and finally classifies it as "abnormal", i.e., with graphic patterns indicative of a pathology, or "normal" (non-pathological).

The referee neural network 3 is a fully connected neural network made up of two neurons, the input of which is a fourteen-component vector (in other embodiments with a different number of CNN networks, the input vector is also sized according to the number of CNN networks) and with 'Softmax' as the activation function. This network is trained with a dataset consisting of the probabilities of each of the fourteen pathologies analyzed by means of the convolutional neural networks 100-113 trained as explained above. These fourteen-component vectors are labeled indicating whether or not the image that has been analyzed for obtaining them contained a pathology, i.e., whether the image was normal or abnormal. In this embodiment, this referee neural network 3 is trained along 1000 'epochs' with a network input 'batch size' of 200 samples, using 'categorical cross-entropy' as a cost function. Like convolutional neural networks, the goodness of this referee neural network 3 is evaluated using a dataset different from the one that has been used during training, and the area under the 'ROC' curve, precision, accuracy, sensitivity, and specificity are obtained as robustness indicators.

The system and method for identifying anomalies in X-rays of the present invention can be integrated in medical image storage infrastructures in order to prioritize the reporting of pathological images by the appropriate healthcare professional.

It can additionally provide an easy-to-interpret report with the results, including the following information: a table with patient information; an analyzed chest X-ray image; an original chest X-ray image with a superimposed attention map in the event that the image has been classified as "abnormal" or pathological, which indicates the regions of the image where the system has detected characteristic patterns of pathology; a list of the three most probable pathologies in the event that the image has been classified as "abnormal"; the probability of abnormality of the X-ray.

The present invention must not be limited to the embodiment herein described. Other configurations can be carried out by those skilled in the art in view of the present description. Therefore, the scope of the invention is defined by the following claims.

The invention claimed is:

1. A method for identifying an anomaly in a chest X-ray image based on neural networks, which comprises:
   training a plurality of convolutional networks with respective sets of training images previously labeled in a binary partition, which classifies the set in two image halves, depending on whether they meet a predetermined criterion for each of the convolutional networks, each convolutional network trained to identify at least one predetermined graphic pattern associated with a pathology,
   providing the chest X-ray image (1) in a classification module (2), wherein the classification module (2) comprises a plurality of convolutional neural networks (100-113);
   obtaining, for each of the convolutional neural networks, a probability of detecting the at least one predetermined graphic pattern;
   receiving in a fully connected neural network (3) the probabilities obtained by each of the convolutional networks; and
   determining, by the fully connected neural network (3), whether the chest X-ray image contains an anomaly, based on the probabilities of detecting predetermined graphic patterns provided by the plurality of convolutional networks,
   wherein the plurality of convolutional networks are independent convolutional networks each trained to determine a probability of a presence of a different pathology from each other.

2. The method according to claim 1, which further comprises training the fully connected neural network with a set of training images previously labeled in a binary partition, which classifies the set in two image halves depending on whether an anomaly is identified therein.

3. The method according to claim 2, which further comprises defining the plurality of convolutional neural networks according to a VGG-19 architecture, wherein the plurality of convolutional neural networks are configured for accepting matrices having a size of 256×256×3.

4. The method according to claim 1, which further comprises processing the X-ray image prior to the step of providing said image to the classification module, wherein the process comprises:
   normalizing the chest X-ray image to gray values in a range between 0 and 1;
   re-scaling rows and columns of the normalized image to a size of 256×256; and
   equalizing the gray value histogram of the re-scaled image.

5. The method according to claim 4, which further comprises substituting the fully connected layers of the VGG-19 architecture with a customized fully connected layer (27) with two output neurons (31, 32) and provide the probability of detecting output by using the 'Softmax' activation function as a final layer of each convolutional neural network.

6. The method according to claim 5, wherein each of the convolutional neural networks comprises convolutional blocks (21-25) with intermediate reduction layers, which further comprises adding an output reduction layer (26) between said convolutional blocks and the customized fully connected layer (27).

7. The method according to claim 6, wherein obtaining, for each of the convolutional neural networks, a probability of detecting the at least one predetermined graphic pattern comprises:
   filtering the chest X-ray image by means of convolution operations in the convolutional blocks (21-25) of each of the convolutional neural networks;
   reducing the chest X-ray image, by the intermediate reduction layers, by means of dividing said image into sub-regions, which are substituted by the maximum value of the sub-region;
   reducing the chest X-ray image, by the output reduction layer (26), by means of averaging the gray values of the output of the convolutional blocks; and
   classifying the result of the output reduction layer (26), by the two output neurons (31, 32) of the customized fully connected layer (27), in one of the two available classes.

8. The method according to claim 6, which further comprises generating a heat map based on the outputs of the output reduction layer (26).

9. The method according to claim 1, wherein each independent convolutional network is trained to determine a probability of a presence of a respective one of the following pathologies: atelectasis (100), cardiomegaly (101), pleural effusion (102), infiltration (103), mass (104), nodule (105), pneumonia (106), pneumothorax (107), consolidation (108), edema (109), emphysema (110), fibrosis (111), pleural thickening (112), and diaphragmatic hernia (113).

10. A system for identifying an anomaly in a chest X-ray image based on neural networks, which comprises:
    a classification module (2) configured for receiving the chest X-ray image (1), wherein said classification module comprises a plurality of convolutional neural networks (100-113), each trained to identify at least one predetermined graphic pattern associated with a pathology, and obtaining a probability of detecting the at least one predetermined graphic pattern; and
    a fully connected neural network (3), configured for receiving the probabilities obtained by each of the convolutional networks of the classification module and for determining whether the chest X-ray image contains an anomaly, based on the probabilities of detecting predetermined graphic patterns provided by the plurality of convolutional neural networks,
    wherein the plurality of convolutional networks are independent convolutional networks each trained to determine a probability of a presence of a different pathology from each other.

11. The system according to claim 10, wherein each of the convolutional networks of the classification module comprises:
   convolutional blocks (21-25) configured for filtering the chest X-ray image by means of a convolution operation;
   intermediate reduction layers intercalated in the convolutional blocks (21-25), configured for reducing the chest X-ray image by means of dividing said image into sub-regions, which are substituted by the maximum value of the sub-region;
   an output reduction layer (26), configured for averaging the gray values at the output of the convolutional blocks; and
   a customized fully connected layer (27) configured for classifying the result of the output reduction layer (26), by the two output neurons (31, 32), in one of the two available classes.

12. The system according to claim 11, which further comprises a processing module configured for receiving the output from the output reduction layer (26) of the convolutional neural networks and generating a heat map with information of at least one graphic pattern associated with each identified pathology.

13. The system according to claim 10, each independent convolutional networks is trained to determine a probability of a presence of a respective one of the following pathologies: atelectasis (100), cardiomegaly (101), pleural effusion (102), infiltration (103), mass (104), nodule (105), pneumonia (106), pneumothorax (107), consolidation (108), edema (109), emphysema (110), fibrosis (111), pleural thickening (112), and diaphragmatic hernia (113).

* * * * *